UNITED STATES PATENT OFFICE.

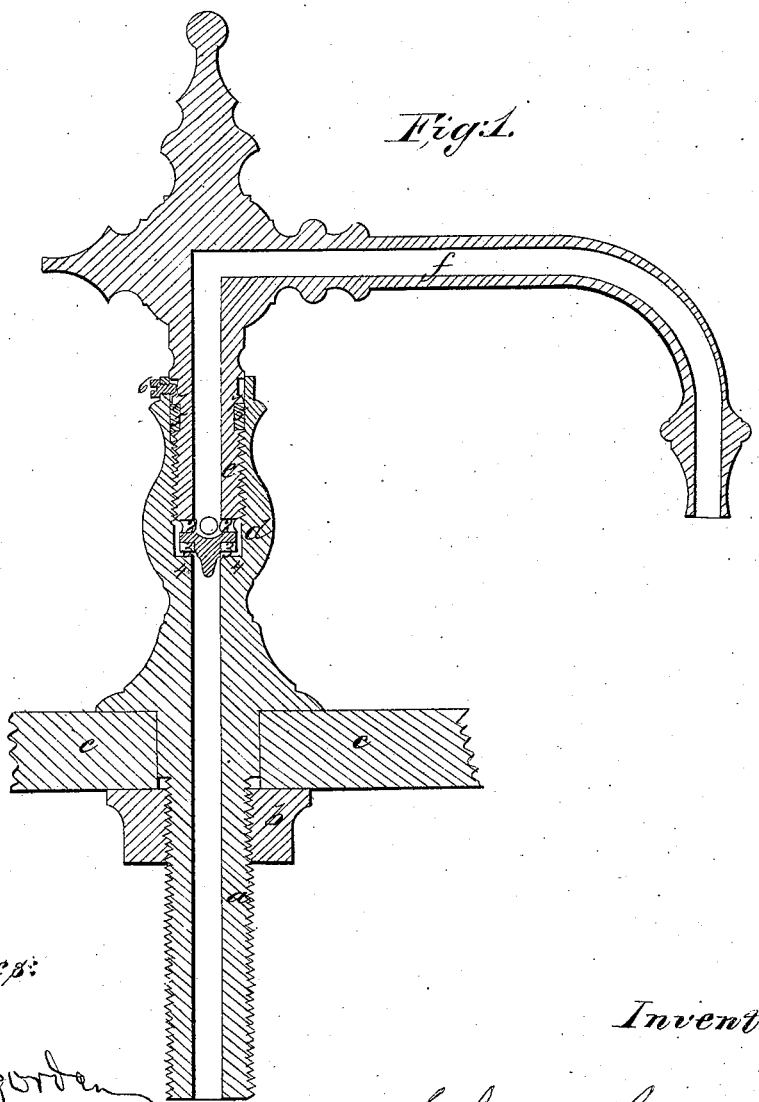

CHARLES HARRISON, OF NEW YORK, N. Y.

BASIN-COCK.

Specification of Letters Patent No. 14,628, dated April 8, 1856.

*To all whom it may concern:*

Be it known that I, CHARLES HARRISON, of the city, county, and State of New York, have invented, made, and applied to use a new and useful Improvement in Basin-Cocks; and I do hereby declare that the following is a full, clear, and exact description of the construction and operation of the same, reference being had to the annexed drawing, making part of this specification, wherein—

Figure 1, is a vertical section of my improvement as in place for use.

Cocks for supplying water to basins have heretofore been formed with a conical plug and bent pipe, which pipe also serves as a handle so that on turning said bent pipe over the basin the supply of water is opened, and passes through said pipe into the basin, and when the bent pipe is turned aside the supply of water is shut off. This character of basin cock being well known needs no further description and the same is found to answer with a small pressure of water, but in cases where a high head of water is made use of, this ordinary form of basin cock is very apt to leak; and as this character of cock is generally only used in the best plumbing work and marble fittings to the basin, said leakage becomes a great detriment and trouble.

The nature of my invention consists in a peculiar arrangement of said cock, in which a screw is made use of, to press onto and stop the flow of water, when the before mentioned bent pipe, to which this said screw is attached, is turned aside from the basin, thereby insuring a perfect stoppage of the water and preventing leakage even under great pressure.

*a*, is the lower end of the cock passing through the marble slab *c*, or other part to which the same is attached by means of a nut *b*, these parts may be of any desired form or construction adapted to the purpose for which the same is to be used.

*d*, is a socket receiving the screw plug *e*, and *f* is a bent pipe connected to said plug *e*, through which the fluid is conveyed from said hollow plug *e*. The end of this plug *e*, is made smaller than the screw part (1) and is provided with cross holes 2, 2, connecting to the hole in said plug *e*.

3, is a washer formed of either metal or elastic substance and connected to the lower end of the plug *e*, in such a manner that when the plug *e*, is screwed down by turning the bent pipe *f*, the said washer or valve 3, is compressed onto the seat 4, effectually shutting out the supply of water from all the other parts, but when said plug *e*, is partially unscrewed the said washer or valve 3, is lifted from its seat 4, and the liquid passes through the holes 2, plug *e*, and pipe *f*. But if this alone were used the water might force itself through the screw (1) and leak at the same time that it was running from the pipe *f*; or where this cock is used with a basin set in a slab that party using the same might turn the pipe *f*, the wrong way and still leave the water running. To prevent these difficulties I make use of a packing 5, of cork or other suitable material which acting above the screw 1, in a smooth cylindrical part of the socket *d*, makes the parts water tight; and I also make use of the screw stop 6, passing through the side of the socket *d*, the point of which enters a groove above a collar 7, in such a manner that the screw plug *e*, can only receive about a quarter turn before the upper side of said collar and a metal stop in said groove take the screw point 6, and arrest the further motion of said screw plug, so that it cannot be turned the wrong way and left running when the tube is not over the basin.

It will be thus seen by my construction of basin cock, that the bent pipe turned over, or off from a basin or similar receptacle, is employed as a means for actuating a screw valve, and that it becomes absolutely necessary that the stop (6) should be made use of, to prevent the screw valve being further opened as would be the case if the bent pipe were turned on the wrong side of the basin; and it will be apparent that the screw 1, being either right or left handed would determine which side the pipe *f* was to be turned off, to screw the valve down to its seat.

I do not claim either a screw valve, or a basin cock operated by the pipe that passes the water, as these separate articles are well known; but I am not aware that the screw valve and bent pipe have ever before been combined with the stop (6) that insures the said pipe being turned off from the basin in that direction which is necessary to screw the valve down onto its seat, instead of further opening it, as described.

What I claim and desire to secure by Letters Patent is—

The screw plug (e,) and its valve (3) actuated by the bent pipe f, when combined with the stop (6) in the manner and for the purposes substantially as specified.

In witness whereof I have hereunto set my signature this eighth day of March 1856.

CHARLES HARRISON.

Witnesses:
 PHILIP JORDAN,
 LEMUEL W. SERRELL.